United States Patent [19]

Delgado

[11] Patent Number: 5,045,569

[45] Date of Patent: * Sep. 3, 1991

[54] HOLLOW ACRYLATE POLYMER MICROSPHERES

[75] Inventor: Joaquin Delgado, St. Paul, Minn.

[73] Assignee: Minnesota Mining and Manufacturing Company, St. Paul, Minn.

[*] Notice: The portion of the term of this patent subsequent to Nov. 6, 2007 has been disclaimed.

[21] Appl. No.: 276,767

[22] Filed: Nov. 30, 1988

[51] Int. Cl.$^5$ .......................... C08J 9/32; B01J 13/02
[52] U.S. Cl. ................................... 521/60; 428/402; 523/223; 524/801; 521/56; 521/63; 521/64; 521/149
[58] Field of Search ...................... 521/56, 60, 63, 64, 521/149; 428/402; 523/223; 524/801

[56] References Cited

U.S. PATENT DOCUMENTS

| | | | |
|---|---|---|---|
| 3,615,972 | 10/1971 | Morehouse, Jr. | 521/56 |
| 3,620,988 | 11/1971 | Cohen | 260/17.4 |
| 3,691,140 | 9/1972 | Silver | 260/78.5 |
| 3,857,731 | 12/1974 | Merrill et al. | 117/122 PA |
| 4,166,152 | 8/1979 | Baker et al. | 428/522 |
| 4,495,318 | 1/1985 | Howard | 524/375 |
| 4,598,112 | 7/1986 | Howard | 524/78 |
| 4,645,783 | 2/1987 | Kinoshita | 523/221 |
| 4,656,218 | 4/1987 | Kinoshita | 524/460 |
| 4,735,837 | 4/1988 | Miyasaka et al. | 428/40 |
| 4,742,086 | 5/1988 | Masamizu et al. | 521/62 |
| 4,839,395 | 6/1989 | Masamizu et al. | 521/56 |

FOREIGN PATENT DOCUMENTS

| | | |
|---|---|---|
| 0034087A2 | 1/1981 | European Pat. Off. . |
| 0209337 | 7/1986 | European Pat. Off. . |
| 3637057A1 | 10/1986 | Fed. Rep. of Germany . |
| 3544882 | 11/1986 | Fed. Rep. of Germany . |

OTHER PUBLICATIONS

Surfactant Systems: Their chemistry, pharmacy and biology, D. Attwood and A. T. Florence, Chapman and Hall, N.Y., N.Y., 1983.

Primary Examiner—Morton Foelak
Attorney, Agent, or Firm—Gary L. Griswold; Walter N. Kirn; Steven E. Skolnick

[57] ABSTRACT

Hollow, polymeric, acrylate, infusible, inherently tacky, solvent-insoluble, solvent-dispersible, elastomeric pressure-sensitive adhesive microspheres having an average diameter of at least about 1 micrometer. Preferred microspheres are those wherein a majority of the hollow microspheres contain at least one of interior void having a diamter of at least 10% of the diameter of the microsphere.

These hollow microspheres are useful as repositionable pressure-sensitive adhesives. The invention also provides pressure-sensitive adhesives consisting essentially of such hollow microspheres. Aqueous suspensions of these microspheres, processes for their preparation, spray repositionable pressure-sensitive adhesive compositions, and microsphere-coated sheet materials are also provided. Surprisingly, hollow microspheres of the invention show reduced or even eliminated adhesive transfer, in comparison with prior art repositionable pressure-sensitive adhesives which are based on solid microspheres.

14 Claims, No Drawings

HOLLOW ACRYLATE POLYMER MICROSPHERES

FIELD OF THE INVENTION

This invention relates to hollow, polymeric, acrylate, infusible, inherently tacky, elastomeric, solvent-dispersible, solvent-insoluble microspheres, to processes for their preparation, and to their use as repositionable pressure-sensitive adhesives.

BACKGROUND OF THE INVENTION

Description of the Related Art

Solid, inherently tacky, elastomeric microspheres are known in the art to be useful in repositionable pressure-sensitive adhesive applications. As used herein, the term "repositionable" refers to the ability to be repeatedly adhered to and removed from a substrate without substantial loss of adhesion capability. Microsphere-based adhesives are thought to perform well in such applications at least in part due to their "self-cleaning" character, wherein substrate contaminants tend to be pushed aside and trapped between the microspheres as the adhesive is applied. Upon removal, the adhesive can then still present a relatively uncontaminated surface for reapplication to the substrate. However, problems with microsphere loss, i.e., microsphere transfer to the substrate, and the resultant need for use of a primer or binder have been recognized in the art.

Numerous references concern the preparation and/or use of inherently tacky, elastomeric acrylate polymeric microspheres which are solid in nature. Such spheres and their use in aerosol adhesive systems having repositionable properties are disclosed in U.S. Pat. No. 3,691,140 (Silver). These microspheres are prepared by aqueous suspension polymerization of alkyl acrylate monomers and ionic comonomers, e.g., sodium methacrylate, in the presence of an emulsifier, preferably an anionic emulsifier. The use of a water-soluble, substantially oil-insoluble ionic comonomer is critical to preventing coagulation or agglomeration of the microspheres.

U.S. Pat. No. 4,166,152 (Baker et al.) describes solid, inherently tacky (meth)acrylate microspheres which are prepared from non-ionic alkyl acrylate or methacrylate monomer(s) in the presence of both an emulsifier and an ionic suspension stabilizer having an interfacial tension sufficient to prevent microsphere agglomeration. Such microspheres are also disclosed in U.S. Pat. Nos. 4,495,318 and 4,598,112 (Howard), where the preparative methods involve the use of a nonionic emulsifier or a cationic emulsifier. All three patents disclose utility as a "reusable adhesive".

U.S. Pat. No. 4,786,696 (Bohnel) describes a suspension polymerization process for preparing solid, inherently tacky (meth)acrylate microspheres which does not require the use of either an ionic comonomer or an ionic suspension stabilizer in order to prevent agglomeration. Rather, the process requires agitation of the vessel charge prior to the initiation of the reaction sufficient to create a suspension of monomer droplets having an average monomer droplet size of between about 5 and about 70 micrometers. In addition to (meth)acrylate monomer, a minor portion of a non-ionic, vinylic comonomer such as, e.g., acrylic acid may be included to modify the "tacky nature" of the microspheres.

U.S. Pat. No. 3,620,988 (Cohen) discloses a method of preparing "bead-type polymers" which involves the use of a water-insoluble polymeric thickening dispersing agent. The method can be applied to produces pressure-sensitive adhesives in the form of coatable bead suspensions, the adhesives comprising a high solids suspension/dispersion of a lightly crosslinked polymer of a higher alkyl acrylate and a tackifier.

U.S. Pat. No. 4,735,837 (Miyasaka et al.) discloses a detachable adhesive sheet having an adhesive layer containing "elastic micro-balls", wherein the microballs partially protrude from the surface of the adhesive layer. The microballs may or may not be tacky. They can be derived from, e.g., (meth)acrylate monomer and an α-olefinic carboxylic acid monomer via suspension polymerization in an aqueous medium. However, no details as to the nature of the surfactants utilized, etc., are disclosed. The microballs and an adhesive are dispersed in solvent, mixed, and coated, with the ratio of adhesive to microballs being from about 1:10 to about 10:1. This ratio is disclosed to be critical in order that all microballs in the final product, including those protruding from the surface, are completely covered with the adhesive. A range of 1,000 to 150,000 pieces per square centimeter is disclosed as preferred.

DE 3,544,882 A1 (Nichiban) describes crosslinked microspheres composed of 90 to 99.5 weight percent of (meth)acrylate ester and 10 to 0.5 weight percent of vinyl type monomer, e.g., acrylic acid, having a reactive functional group through which crosslinking is achieved by reaction with an oil-soluble crosslinking agent. The microspheres are prepared by dispersing in water a solution (in organic solvent) of copolymer prepared by known methods such as solution, bulk, emulsion, or suspension polymerization. (However, the reference notes that in cases where emulsion or suspension polymerization is used with water as a dispersion medium, it is not necessary to make a new aqueous dispersion.) When tacky, the spheres are said to be useful in spray or coated sheet form as "removable adhesive". The stated purpose of the invention is to provide microspheres having a uniform particle size, but it is also stated that the microspheres may contain other monomers such as vinyl acetate, styrene, acrylonitrile, methacrylonitrile, etc., "...to prevent partial transfer of the adhesive when the carrier (backing) is pulled away from the substrate...".

U.S. Pat. Nos. 4,645,783 and 4,656,218 (Kinoshita) disclose a "repeatedly usable and releasable sheet" coated with an aqueous suspension of microspheres obtained by aqueous suspension polymerization (in the presence of a protective colloid comprising casein as a main ingredient) of one or more alkyl(meth)acrylate esters, one or more α-monoolefin carboxylic acids, and one or more other vinyl monomers. The microspheres are preferably interspersed with finer polymer particles prepared by polymerization of one or more vinyl monomers in an aqueous medium. These fine polymer particles are said to be "... effective in improving the anchorage to the adherend and the adhesion to the substrate after the aqueous suspension prepared in accordance with the present invention is applied to the substrate".

U.S. Pat. No. 3,857,731 (Merrill et al.) and EP 209337 (Smith & McLaurin) both address problems with microsphere adhesive transfer. The former discloses sheets coated with the tacky elastomeric copolymer microspheres of the Silver patent and a binder material which provides sockets in which the microspheres are held by predominately mechanical forces. The latter states that microsphere adhesives could be put to more demanding applications if it were not for the drawback of adhesive transfer. Tacky, elastomeric microspheres are then described which have a composition formed from non-ionic monomers alone or together with a proportion of ionic comonomers. The microspheres further comprise an adhesion promoting monomer having functionality which remains unreacted during polymerization of the monomers and is available for subsequently binding the microspheres through electrostatic interaction or chemical bonding to a substrate or binder-coated substrate. Preferably, the microspheres are derived from at least one alkyl acrylate or methacrylate ester.

In view of the foregoing, it is an object of this invention to reduce or eliminate problems with microsphere adhesive transfer without the need for a separate binder material or for inclusion of an additional adhesion-promoting monomer.

It is a further object of this invention to provide an elastomeric microsphere-based, repositionable pressure-sensitive adhesive which exhibits greater shear adhesion for a given coating weight of adhesive. Thus, the adhesive can support heavier objects.

It is a further object of this invention to provide an elastomeric microsphere-based, repositionable pressure-sensitive adhesive which exhibits greater peel adhesion for a given coating weight of adhesive. This yields a greater amount of tack for an equal weight of microspheres.

It has now been discovered that these objects, and others, which will become apparent from the following discussion may be achieved by preparing microspheres which, in addition to being inherently tacky, elastomeric, infusible, solvent-insoluble, and solvent-dispersible, are also hollow.

SUMMARY OF THE INVENTION

This invention provides hollow, polymeric, acrylate, inherently tacky, infusible, solvent-insoluble, solvent-dispersible, elastomeric pressure-sensitive adhesive microspheres having diameters of at least about one micrometer. Preferred hollow microspheres contain one or more interior voids having diameters at least 10% of the of the hollow microspheres. These microspheres are useful as repositionable pressure-sensitive adhesives.

The invention also provides pressure-sensitive adhesives based on the hollow microspheres, aqueous suspensions of these microspheres, processes for their preparation, spray repositionable pressure-sensitive adhesive compositions, and pressure-sensitive adhesive-coated sheet materials.

Surprisingly, pressure-sensitive adhesives based on hollow microspheres of the invention show reduced or even eliminated adhesive transfer, in comparison with prior art repositionable pressure-sensitive adhesives which are based on solid microspheres. The hollow microspheres of this invention are, in effect, "self-priming" and, thus, require neither separate primer or binder material nor an additional, adhesion-promoting monomer. It has also been discovered that, relative to prior art systems, greater shear and peel adhesion for a given coating weight of adhesive can be achieved by using hollow microspheres.

This invention also provides a pressure-sensitive adhesive consisting essentially of these hollow microspheres. More specifically, the pressure-sensitive adhesive consists essentially of hollow, polymeric, acrylate, inherently tacky, infusible, solvent-insoluble. solvent-dispersible, elastomeric microspheres comprising:
 a) at least about 85 parts by weight of at least one alkyl acrylate or alkyl methacrylate ester; and
 b) up to about 15 parts by weight of at least one polar monomer, a majority of the microspheres having one or more interior voids having a diameter of at least about 10% of the diameter of the microsphere.

Aqueous suspensions of these hollow microspheres may be prepared by a two-step emulsification process comprising the steps of:
 a) forming a water-in-oil emulsion of an aqueous solution of polar monomer(s) in oil phase monomer(s);
 b) forming a water-in-oil-in-water emulsion by dispersing the water-in-oil emulsion into an aqueous phase; and
 c) initiating polymerization preferably by application of heat (or radiation).

Aqueous suspensions of hollow microspheres which contain moderately ionized polar monomer(s) may also be prepared by a simpler ("one-step") emulsification process comprising aqueous suspension polymerization of at least one alkyl acrylate or alkyl methacrylate ester monomer and at least one non-ionic polar monomer in the presence of at least one emulsifier which is capable of producing a water-in-oil emulsion inside the droplets, as defined below, which is substantially stable during emulsification and polymerization. Both methods produce an aqueous suspension of monomer droplets which upon polymerization become microspheres, a majority of which have at least one interior cavity that, upon drying, becomes a void.

The following terms have these meanings as used herein:

1. The term "droplet" means the liquid stage of the microspheres prior to the completion of polymerization.

2. The term "cavity" means a space within the walls of a droplet or microsphere when still in the suspension or dispersion medium prior to drying, and thus containing whatever medium was used.

3. The term "void" means an empty space completely within the walls of a polymerized microsphere.

4. The term "hollow" means containing at least one void or cavity.

All percents, parts, and ratios described herein are by weight unless specifically stated otherwise.

DETAILED DESCRIPTION OF THE INVENTION

Alkyl acrylate or methacrylate monomers useful in preparing the hollow microspheres and pressure-sensitive adhesives of this invention are those monofunctional unsaturated acrylate or methacrylate esters of non-tertiary alkyl alcohols, the alkyl groups of which have from 4 to about 14 carbon atoms. Such acrylates are oleophilic, water emulsifiable, have restricted water solubility, and as homopolymers, generally have glass transition temperatures below about −20° C. Included within this class of monomers are, for example, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

Preferred acrylates include isooctyl acrylate, isononyl acrylate, isoamyl acrylate, isodecyl acrylate, 2-ethylhexyl acrylate, n-butyl acrylate, sec-butyl acrylate, and mixtures thereof. Acrylate or methacrylate or other vinyl monomers which, as homopolymers, have glass transition temperatures higher than about −20° C., e.g., tert-butyl acrylate, isobornyl acrylate, butyl methacrylate, vinyl acetate, N-vinyl pyrrolidone, acrylamide, and the like, may be utilized in conjunction with one or more of the acrylate or methacrylate monomers provided that the glass transition temperature of the resultant polymer is below about −20° C.

Polar monomers suitable for copolymerization with the acrylate or methacrylate monomers are those polar monomers which are both somewhat oil-soluble and watersoluble, resulting in a distribution of the polar monomer between the aqueous and the oil phases.

Representative examples of suitable polar monomers include moderately ionized polar monomers such as acrylic acid, methacrylic acid, itaconic acid, crotonic acid, maleic acid, fumaric acid, sulfoethyl methacrylate, and ionic monomers such as sodium methacryate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-($\beta$-methacryloxyethyloxy-ethyl) ammonium propionate betaine, trimethylamine methacrylimide, 1,1-dimethyl-1-(2,3-dihydroxypropyl)amine methacrylimide, and the like. Preferred polar monomers are monoolefinic mono- and dicarboxylic acids, salts thereof and mixtures thereof.

The hollow microspheres of this invention and the pressure-sensitive adhesives made therefrom comprise at least about 85 parts by weight of at least one alkyl acrylate or alkyl methacrylate ester and correspondingly, up to about 15 parts by weight of one or more polar monomers. Preferably, at least one polar monomer is included in the composition, but hollow microspheres may also be prepared using acrylate or methacrylate monomer(s) alone or in combination only with other vinyl monomers, e.g., vinyl acetate. However, when methacrylate monomer alone is utilized, a crosslinking agent, infra, must be included. For most polar monomers, incorporation of from about 1 part to about 10 parts by weight is preferred, as this ratio provides hollow microspheres with balanced pressure-sensitive adhesive properties.

Aqueous suspensions of the hollow microspheres may be prepared by a "two-step" emulsification process which first involves forming a water-in-oil emulsion of an aqueous solution of polar monomers in oil phase monomer, i.e., at least one acrylate or methacrylate ester, using an emulsifier having a low hydrophilic-lipophilic balance (HLB) value. Where it is desirable not to include a polar monomer, water may be mixed directly with the oil phase monomer, i.e., acrylate or methacrylate ester, and emulsifier to form the water-in-oil emulsion. Suitable emulsifiers are those having an HLB value below about 7, preferably in the range of about 2 to about 7. Examples of such emulsifiers include sorbitan monooleate, sorbitan trioleate, and ethoxylated oleyl alcohol such as Brij ™ 93, available from Atlas Chemical Industries, Inc. Thus, in this first step, oil phase monomer(s), emulsifier, a free radical initiator, and, optionally, a crosslinking monomer or monomers as defined below are combined, and an aqueous solution of all or a portion of the polar monomer(s) is agitated and poured into the oil phase mixture to form a water-in-oil emulsion. A thickening agent, e.g., methyl cellulose may also be included in the aqueous phase of the water-in-oil emulsion. In the second step, a water-in-oil-in-water emulsion is formed by dispersing the water-in-oil emulsion of the first step into an aqueous phase containing an emulsifier having an HLB value above about 6. The aqueous phase may also contain any portion of the polar monomer(s) which was not added in step one. Examples of such emulsifiers include ethoxylated sorbitan monooleate, ethoxylated lauryl alcohol, and alkyl sulfates. In both steps, when an emulsifier is utilized, its concentration should be greater than its critical micelle concentration, which is herein defined as the minimum concentration of emulsifier necessary for the formation of micelles, i.e., submicroscopic aggregations of emulsifier molecules. Critical micelle concentration is slightly different for each emulsifier, usable concentrations ranging from about $1.0 \times 10^{-4}$ to about 3.0 moles/liter. Additional detail concerning the preparation of water-in-oil-in-water emulsions, i.e., multiple emulsions, may be found in various literature references, e.g., *Surfactant Systems: Their Chemistry, Pharmacy, & Biology*, (D. Attwood and A. T. Florence, Chapman & Hall Limited, New York, New York, 1983). The final process step of this method of the invention involves the application of heat or radiation to initiate polymerization of the monomers. Suitable initiators are those which are normally suitable for free radical polymerization of acrylate monomers and which are oil-soluble and of very low solubility in water. Examples of such initiators include thermally-activated initiators such as azo compounds, hydroperoxides, peroxides, and the like, and photoinitiators such as benzophenone, benzoin ethyl ether, and 2,2-dimethoxy-2-phenyl acetophenone. Use of a water-soluble polymerization initiator causes formation of substantial amounts of latex. The extremely small particle size of latex particles renders any significant formation of latex undesirable. The initiator is generally used in an amount ranging from about 0.01 percent up to about 10 percent by weight of the total polymerizable composition, preferably up to about 5 percent.

Aqueous suspensions of hollow microspheres which contain moderately ionized polar monomer(s) may also be prepared by a "one-step" emulsification process comprising aqueous suspension polymerization of at least one alkyl acrylate or alkyl methacrylate ester monomer and at least one moderately ionized polar monomer in the presence of at least one emulsifier capable of producing a water-in-oil emulsion inside the droplets which is substantially stable during emulsification and polymerization. As in the two-step emulsification process, the emulsifier is utilized in concentrations greater than its critical micelle concentration. In general, high HLB emulsifiers are required, i.e., emulsifiers having an HLB value of at least about 25, will produce stable cavity-containing droplets during the polymerization, and are suitable for use in this one-step process. Examples of such emulsifiers include alkylarylether sulfates such as sodium alkylarylether sulfate, e.g., Triton ™ W/30, available from Rohm and Haas, alkylarylpolyether sulfates such as alkylarylpoly(ethylene oxide) sulfates, preferably those having up to about 4 ethyleneoxy repeat units, and alkyl sulfates such as sodium lauryl sulfate, ammonium lauryl sulfate, triethanolamine lauryl sulfate, and sodium hexadecyl sulfate, alkyl ether sulfates such as ammonium lauryl ether sulfate, and alkylpolyether sulfate such as alkyl poly(ethylene oxide) sulfates, preferably those having up to about 4 ethyleneoxy units. Alkyl sulfates, alkyl ether sulfates, and alkylarylether sulfates are preferred as they provide a maximum void volume per microsphere for a minimum amount of surfactant. Polymeric stabilizers may also be present but are not necessary.

The composition may also contain a crosslinking agent such as a multifunctional (meth)acrylate, e.g., butanediol diacrylate or hexanediol diacrylate, or other multifunctional crosslinker such as divinylbenzene. When used, crosslinker(s) is (are) added at a level of up to about 1.0 percent, preferably up to about 0.5 percent, of the total polymerizable composition.

The hollow microspheres of the invention are normally tacky, elastomeric, insoluble but swellable in organic solvents, and small, typically having diameters of at least 1 micrometer, preferably in the range of about 1 to about 250 micrometers. The voids typically range in size up to about 100 micrometers or larger. The majority of the hollow microspheres prepared by the methods of this invention contain at least one void with a void diameter which is at least about 10% of the diameter of the microsphere, preferably at least about 20%, more preferably, at least about 30%.

Following polymerization, an aqueous suspension of the hollow microspheres is obtained which is stable to agglomeration or coagulation under room temperature conditions. The suspension may have non-volatile solids contents of from about 10 to about 50 percent by weight. Upon prolonged standing, the suspension separates into two phases, one phase being aqueous and substantially free of polymer, the other phase being an aqueous suspension of microspheres having at least one cavity, which, upon drying, becomes a void. Both phases may contain a minor portion of small latex particles. Decantation of the microsphere-rich phase provides an aqueous suspension having a non-volatile solids content on the order of about 40-50 percent which, if shaken with water, will readily redisperse. If desired, the aqueous suspension of hollow microspheres may be utilized immediately following polymerization to provide inherently tacky pressure-sensitive adhesive coatings. The suspension may be coated on suitable flexible or inflexible backing materials by conventional coating techniques such as knife coating or Meyer bar coating or use of an extrusion die.

Alternatively, the aqueous suspension may be coagulated with polar organic solvents such as methanol, with ionic emulsifiers having a charge opposite to that of the emulsifier used in the polymerization process, or with saturated salt solutions, or the like, followed by washing and drying. The dried hollow microspheres, with sufficient agitation, will readily disperse in common organic liquids such as ethyl acetate, tetrahydrofuran, heptane, 2-butanone, benzene, cyclohexane, and esters, although it is not possible to resuspend them in water. Solvent dispersions of the hollow microspheres may also be coated on suitable backing materials by conventional coating techniques, as described above for aqueous suspensions.

Suitable backing materials for the aqueous or solvent based coatings include paper, plastic films, cellulose acetate, ethyl cellulose, woven or nonwoven fabric formed of synthetic or natural materials, metal, metallized polymeric film, ceramic sheet material, and the like. Primers or binders may be used, but they are not required.

Suspensions or dispersions of the hollow microspheres in a liquid medium, e.g., water or an organic liquid as described above, may be sprayed by conventional techniques without cobwebbing or may be incorporated in aerosol containers with suitable propellants such as alkanes, alkenes, or chlorofluorocarbons, e.g., Freons TM. The hollow microspheres of the invention provide a repositionable pressure-sensitive adhesive, i.e., a pressure-sensitive adhesive having a degree of adhesion which permits separation, repositioning, and rebonding.

Useful aerosol formulae have a solids content of from about 5% to about 20%, preferably from about 10% to about 16%.

The pressure-sensitive adhesive properties of the hollow microspheres may be altered by addition of tackifying resin and/or plasticizer. Preferred tackifiers for use herein include hydrogenated rosin esters commercially available from companies such as Hercules Inc., under such trade names as Foral TM, and Pentalyn TM. Individual tackifiers include Foral TM 65, Foral TM 85, and Foral TM 105. Other useful tackifiers include those based on t-butyl styrene. Useful plasticizers include dioctyl phthalate, 2-ethyl hexyl phosphate, tricresyl phosphate, and the like.

It is also within the scope of this invention to include various other components, such as pigments, fillers, stabilizers, or various polymeric additives.

The pressure-sensitive adhesives of the invention have been found to show little or no microsphere transfer, thereby reducing or even eliminating the transfer problems disclosed by the prior art. These pressure-sensitive adhesives also provide greater peel and shear adhesion for a given coating weight than do prior art repositionable pressure-sensitive adhesives which are solid microsphere-based.

These and other aspects of the invention are illustrated by the following examples which should not be viewed as limiting in scope.

TEST METHODS

Microsphere Transfer

An area of coated sheet material was marked and observed using an optical microscope. The number of microspheres within the area were counted and this number designated "Y". The marked area of the coated sheet was then adhered to Kromekote TM paper, a commercially available paper for the printing industry, for a few seconds and then removed. The marked area was again observed with an optical microscope, and the number of microspheres remaining in the area were counted and this number designated "Z". Percent microsphere transfer is defined as 100 times the ratio of the difference between the number of microspheres initially present (in the marked area of the coated sheet) after coating and the number of microspheres remaining in the marked area after each adhesion and removal from the paper substrate (Y - Z) to the number of microspheres initially present in the area just after coating.

$$\text{Percent transfer} = \frac{100(Y - Z)}{Y}$$

Peel Adhesion

Peel adhesion is the force required to remove a coated flexible sheet material from a test panel measured at a specific angle and rate of removal. In the examples, this force is expressed in grams per centimeter (cm) width of coated sheet. The procedure followed is:

A strip 1.27 cm in width of the coated sheet is applied to the horizontal surface of a clean glass test plate with at least 12.7 lineal cm in firm contact. A 2 kg hard rubber roller is used to apply the strip. The free end of the coated strip is doubled back nearly touching itself so the angle of removal will be 180°. The free end is attached to the adhesion tester scale. The glass test plate is clamped in the jaws of a tensile testing machine which is capable of moving the plate away from the scale at a constant rate of 2.3 meters per minute. The scale reading in grams is recorded as the tape is peeled from the glass surface. The data is reported as the average of the range of numbers observed during the test.

Shear Strength

The shear strength is a measure of the cohesiveness or internal strength of an adhesive. It is based upon the amount of force required to pull an adhesive strip from a standard flat surface in a direction parallel to the surface to which it has been affixed with a definite pressure. It is measured in minutes required to pull a standard area of adhesive coated sheet material from a stainless steel test panel under stress of a constant, standard load.

The tests were conducted on strips of coated sheet material applied to a stainless steel panel such that a 1.27 cm by 1.27 cm portion of each strip was in firm contact with the panel with one end portion of the tape being free. The panel with the coated strip attached was held in a rack such that the panel formed an angle of 178° with the extended tape free end which was tensioned by application of a force of 200 grams applied as a hanging weight from the free end of the coated strip. The 2° less than 180° is used to negate any peel forces, thus insuring that only the shear forces are measured, in an attempt to more accurately determine the holding power of the tape being tested. The time elapsed for each coated film to separate from the test panel was recorded as the shear strength.

ADHESIVE-SOLVENT EVALUATIONS

Sprayability

The composition to be tested is sprayed out of an aerosol can onto aluminum foil at 22° C and an immediate visual evaluation is made. Sprayability is considered "good" when there is a wide pattern of finely atomized spray with no streaming. Sprayability is "fair" when the spray is coarse with a narrower pattern and occasional globs are present in the spray.

Spray Adhesive Transfer

A light coat of the composition is sprayed at 22° C. onto standard white copier paper. At a set time after application, the adhesive side of the paper is briefly contacted with an acetone-wiped plate glass specimen using hand pressure. The paper is then peeled off and the glass is held up to a light source to visually determine the amount of adhesive transfer from the paper to the glass. For an adhesive to be evaluated as having no adhesive transfer means that no microspheres are seen on the substrate when viewed with the naked eye.

Soak-In on Paper

A light coat of the adhesive composition is sprayed onto standard white copy paper and the opposite side of the paper is immediately evaluated visually for soak through. "Low" soak-in means that 0-10% of the sprayed area soaks through to the reverse side of the paper, "moderate" soak-in equals about 50% soaks through, "high" soak-in equals 90% or higher soak-in.

EXAMPLES

EXAMPLE 1

In a one-liter resin reactor equipped with mechanical stirrer, condenser, and inlet-outlet lines for vacuum and argon, 450 grams of deionized water, 141 grams of isooctyl acrylate, 0.04 gram of 1,4-butanedioldiacrylate, 9.0 grams of acrylic acid and 0.5 gram of benzoyl peroxide were charged. Vacuum was applied to evacuate the reactor atmosphere, and the reactor was then purged with argon. The agitation was set to 400 rpm and when the initiator had dissolved, 1.5 grams of ammonium lauryl sulfate (Standapol TM A, Henkel AG) were added. The temperature of the reactor was raised to 60° C. and maintained at such temperature for 22 hours. An argon purge was maintained during the polymerization. After the 22-hour period, the suspension was allowed to cool to room temperature. The reactor was then emptied and the suspension filtered. Optical microscopy revealed hollow microspheres from about 4 to about 90 micrometers in diameter suspended in water. The majority of the microspheres contained a central cavity having a cavity diameter of at least 30% of the diameter of the microsphere. After drying in a vacuum oven, the microspheres were microtomed. Scanning electron microscopy also showed that the microspheres contained large central voids having diameters of from about 2 to about 65 micrometers.

EXAMPLES 2-11

These examples illustrate the use of different polar monomers and initiators to prepare hollow, tacky elastomeric microspheres using the general equipment and one-step emulsification technique outlined in Example 1. Details of the compositions are listed in Table I. In all cases 1.5 grams of ammonium lauryl sulfate (Standapol TM A, Henkel AG) were used. The reactor temperature was 60° C. in all the following examples except in Examples 6 and 11 where 50° C. was used.

TABLE I

| Example Number | Isooctyl acrylate (g) | Polar Monomer | Microsphere Diameter (μm) | Cavity Diameter (μm) |
|---|---|---|---|---|
| 2 | 141 | 9 g acrylic acid | 4-70 | 2-35 |
| 3 | 147 | 3 g acrylic acid | 4-70 | 2-35 |
| 4 | 135 | 15 g acrylic acid | 7-70 | 5-30 |
| 5 | 148.5 | 1.5 g methacrylic acid | 3-50 | 2-30 |
| 6 | 141 | 6 g itaconic acid | 5-50 | 2-30 |
| 7 | 147 | 3 g sulfoethyl-methacrylate | 4-55 | 1-45 |
| 8 | 141 | 9 g crotonic acid | 4-50 | 2-35 |
| 9 | 147 | 3 g fumaric acid | 5-80 | 2-50 |
| 10 | 148 | 1.5 g maleic acid | 4-55 | 5-30 |
| 11 | 141 | 6 g itaconic acid | 3-80 | 2-30 |

The initiator used in all cases was 0.5 grams of benzoyl peroxide with the exception of Example No. 11 for which the initiator was 0.5 grams of lauryl peroxide.

EXAMPLES 12 to 17

These examples illustrate the use of various alkyl (meth)acrylate ester monomers (see Table II) for the preparation of hollow, tacky, elastomeric microspheres using acrylic acid as the polar monomer and 1.5 grams of ammonium lauryl sulfate as the surfactant. The polymerization equipment and polymerization technique used were those described in Example 1.

TABLE II

| Example Number | Alkyl methacrylate | Acrylic acid (g) | Initiator (Benzoyl Peroxide) |
|---|---|---|---|
| 12 | 141 g 2-ethyl-hexyl acrylate | 9.0 | 0.5 g |
| 13 | 144 g n-butyl acrylate | 6.0 | 0.5 g |
| 16 | 144 g isononyl acrylate | 6.0 | 0.5 g |
| 15 | 135 g isooctyl acrylate 12 g methyl methacrylate | 3.0 | 0.5 g |
| 16 | 141 g lauryl acrylate | 9.0 | 0.5 g |
| 17 | 127.5 g isooctyl acrylate 18 g vinyl acetate | 4.5 | 0.5 g |

EXAMPLES 18 to 24

These examples illustrate the use of various surfactants as well as various multifunctional monomers in the preparation of hollow, tacky elastomeric microspheres (see Table III). In all cases 0.5 gram of benzoyl peroxide was used except in Example 20 where 0.5 gram of lauryl peroxide was substituted. Example 24 illustrates the use of a combination of a nonionic surfactant and an anionic surfactant.

TABLE III

| Example Number | Monomers | Surfactant |
|---|---|---|
| 18 | 141 g isooctyl acrylate 9.0 g acrylic acid | 1.5 g sodium lauryl sulfate |
| 19 | 141 g isooctyl acrylate 9.0 g acrylic acid | 1.5 g sodium hexadecyl sulfate |
| 20 | 73.5 g isononyl acrylate 73.5 g 2-ethyl hexyl acrylate 3.0 g acrylic acid 0.1 g 1,6-hexanediol diacrylate | 1.6 g triethanolamine lauryl sulfate |
| 21 | 120 g isooctyl acrylate 24 g isononyl acrylate 6.0 g acrylic acid 0.1 g 1,4-butanediol diacrylate | 1.5 g ammonium lauryl ether sulfate |
| 22 | 141 g isooctyl acrylate 9.0 g acrylic acid | 14 g Triton TM W/30* |
| 23 | 141 g isooctyl acrylate 9.0 g acrylic acid 0.08 g divinyl benzene | 1.5 g ammonium lauryl sulfate |
| 24 | 146 g isooctyl acrylate 2.0 g acrylic acid 1.0 g methacrylic acid | 1.5 g ammonium lauryl sulfate 1.0 g Siponate TM Y500-70** |

*Triton TM W/30 is a tradename for a 27% aqueous solution (also containing 27 percent 2-propanol), of sodium alkylaryl ether sulfate available from Rohm and Haas Company.
**Siponate TM Y500-70 is a trade name for a 70% aqueous solution of oleyl alcohol ethoxylate available from Alcolac Chemical Company.

EXAMPLES 25C to 27C

These are comparative examples. When a surfactant with a HLB value less than about 25 was used in the one-step polymerization process, tacky, elastomeric microspheres having no voids were formed. Polymerization equipment and polymerization technique used were those described in Example 1. Benzoyl peroxide (0.5 gm) was used as the initiator in all examples. The compositions are listed in Table IV.

TABLE IV

| Example Number | Monomers | Surfactant |
|---|---|---|
| 25C | 141 g isooctyl acrylate 9.0 g acrylic acid | 1.5 g sodium dodecyl benzene sulfonate |
| 26C | 141 g isooctyl acrylate 9.0 g itaconic acid | 1.5 g sodium dodecyl benzene sulfonate |
| 27C | 141 g isooctyl acrylate 9.0 g acrylic acid | 7.0 g Triton X200* |

**Triton TM X-200 is a tradename for a 28 weight percent aqueous suspension of sodium alkylaryl polyether sulfonate available from Rohm and Haas Company.

EXAMPLE 28

The following example illustrates the preparation of hollow pressure-sensitive adhesive microspheres using a two step emulsification process. Six grams of ammonium acrylate were dissolved in 450 grams of deionized water. A water-in-oil emulsion was prepared in an Omni TM mixer by stirring 100 grams of the above-mentioned aqueous solution with 144 grams of isooctyl acrylate containing 3 grams of Span 80 TM, sorbitan monoleate available from ICI Americas, Inc. and 0.5 gram of benzoyl peroxide. The remaining ammonium acrylate aqueous solution was placed in a resin reactor similar to that described in Example 1 and 1.5 grams of ammonium lauryl sulfate were added. The agitation was set to 400 rpm. The oil-in-water emulsion prepared previously was added to the reactor. The temperature was increased to 60° C. and maintained for 22 hours. After the 22-hour period, the suspension was allowed to cool to room temperature. The reactor was emptied and the suspension filtered. Optical microscopy of the suspension showed microspheres having diameters of from about 4 micrometers to about 30 micrometers, a majority containing internal cavities.

EXAMPLE 29

This example illustrates the use of a thickening agent in the aqueous phase of the water-in-oil emulsion for the preparation of hollow microspheres by the two-step emulsification process.

The emulsification and polymerization equipment were those described in the previous example. An aqueous solution of 6 grams of ammonium acrylate in 450 grams of water was prepared. Two grams of methyl cellulose were added and dissolved into 100 grams of this aqueous solution. A water-in-oil emulsion of the aqueous solution of the ammonium acrylate and methyl cellulose in 144 grams of isooctyl acrylate containing 5.75 grams of "Span 80" and 0.5 gram of benzoyl peroxide was prepared as described in Example 29. The water-in-oil emulsion was poured into the reactor containing the rest of the ammonium acrylate aqueous solution and 1.5 grams of ammonium lauryl sulfate. The temperature of the reactor was 60° C. when the water-in-oil-emulsion was poured, and the agitation was 300 rpm. The reactor was kept at 60° C. for 22 hours. At the end of this period, the suspension was treated as in Example 28. The diameter of the cavity containing microspheres was in the range of from about 4 to about 40 micrometers.

EXAMPLES 30 to 33

Examples 30 to 33 were executed following the procedure described in Example 27. Materials and conditions used and diameter of the resulting microspheres are specified in Table V.

EXAMPLE 34

This example illustrates the use of a photoinitiator.

A solution of 2.5 grams of N-(3-sulfopropyl)-N-methacryloxy ethyl N,N-dimethyl ammonium betaine and 150 grams of deionized water was prepared in a three-neck 200cc Morton flask. Thirty-five cc of the aqueous solution of the betaine were emulsified for 15 minutes into 47.5 grams of isooctyl acrylate containing 0.02 gram of butanediol diacrylate, 4 grams of "Span 80" and 0.125 gram of 2,2-dimethoxy-2-phenylacetophenone in an Omni TM mixer to form a water-in-oil-emulsion. The water-in-oil-emulsion was slowly added to the reactor. The reactor contained the rest of the aqueous solution of the betaine, 1.172 grams of Span 20 and 0.33 gram of Tween 80 TM, ethoxylated sorbitan monoleate available from ICI Americas, Inc. while stirring. Fifteen minutes after the completion of the addition of the water-in-oil emulsion, 10 cc of the water-in-oil-in water emulsion were taken from the reactor and placed in a transparent rectangular glass cell. The cell was then irradiated for 10 minutes with ultraviolet light. After the irradiation period, the suspension was recovered and observed in the optical microscope. Microspheres having diameters of from about 1 micrometer to about 20 micrometers were observed. These microspheres had cavities in their interior. The majority of the microspheres contained at least one void having a void diameter of at least 10% of the diameter of the microsphere.

EXAMPLE 35C

This example illustrates the fact that use of a ionic monomer in the one-step emulsification process yields solid tacky microspheres rather than hollow. In a one-liter resin reactor equipped with mechanical stirrer, condenser, and inlet-outlet lines for vacuum and argon, 450 grams of deionized water, 144 grams of isooctyl acrylate, six grams of ammonium acrylate, 0.5 gram of benzoyl peroxide and 1.5 grams of ammonium lauryl sulfate were charged as described in Example 1 under identical conditions of temperature and agitation. A suspension was recovered from the reactor. Optical microscopy showed microspheres of from about 4 to about 40 micrometers in diameter in the suspension. These microspheres had essentially no internal cavities.

TABLE V

| Example | Monomers | Emulsifier I | Emulsifier II | Microsphere Diameter (μm) |
|---|---|---|---|---|
| 30 | 150 g isooctyl acrylate | 5.5 g Span 80 | 1.5 g ammonium | 2–40 |
| 31 | 150 g 2-ethyl hexyl acrylate | 5.5 g Span 80 | 1.5 g ammonium lauryl sulfate | 2–56 |
| 32 | 144 g isooctyl acrylate 6 g acrylic acid | 6.0 g Span 80 | 15 g Triton W/30 | 4–50 |
| 33 | 139.5 g isooctyl acrylate 10.5 g vinyl acetate | 5.75 g Span 80 | 1.375 g ammonium lauryl sulfate | 4–56 |

All examples contained 0.5 g benzoyl peroxide as the initiator except for Example 32 which contained 0.5 g lauryl peroxide.
All examples were prepared at 325 rpm except for Example 32 which was prepared at 350 rpm.

EXAMPLE 36

This example compares the adhesive properties of sheet material coated with hollow, tacky pressure sensitive adhesive microspheres and with solid tacky pressure-sensitive adhesive microspheres.

Microspheres prepared in Example 2 (94:6 isooctyl acrylate:acrylic acid hollow microspheres), Example 25C (94:6 isooctyl acrylate:acrylic acid solid microspheres), and Example 35C (96:4 isooctyl acrylate:ammonium acrylate non-hollow microspheres) were dispersed in heptane (5% microspheres) and coated with a knife coater on 49 micrometers thick unprimed cellulose acetate film at a coating weight of 4.1 g/m². The coated samples were dried at room temperature and conditioned overnight at a constant temperature of 22.2° C. and 50% relative humidity. The coated samples were then tested for adhesive transfer, peel adhesion, and shear strength. Test results are shown in Table VI.

TABLE VI

| Microsphere Sample | % Transfer after one adhesion and one removal | % Transfer after two adhesions and two removals | Peel Adhesion (g/cm) | Shear Strength (Minutes) |
|---|---|---|---|---|
| Example 2 (hollow) | 6.0 | 18.6 | 204 | 248.0 |
| Example 25C (solid) | 48.7 | 76.9 | 178.6 | 59.5 |
| Example 35C (solid) | 76.4 | 92.7 | 153.4 | 35.0 |

As can be observed in the test results shown above, the sheet material coated with hollow microspheres exhibited such lower adhesive transfer, higher peel adhesion, and higher shear strength than either the sheet material coated with solid microspheres of the same polymer composition or the sheet material coated with isooctyl acrylate:ammonium acrylate solid microspheres.

EXAMPLE 37

This example illustrates the use of hollow pressure-sensitive adhesive microspheres of the invention in aerosol adhesive systems. The microspheres were tested in various solvents for sprayability, paper soak-in and adhesive transfer. As the results in Table VII show, the microspheres provided good sprayability with low adhesive transfer in a wide variety of solvents.

TABLE VII

| Solvent | Sprayability | Adhesive Transfer | Soak-In On Paper | Time (Sec.)* |
|---|---|---|---|---|
| Hexane | Good | No | Low | 10 |
| Isopar B | Good | No | Low | 15 |

TABLE VII-continued

| | | | | |
|---|---|---|---|---|
| Heptane | Good | No | Low | 20 |
| Cyclohexane | Good | No | Low | 20 |
| Toluene | Good | No | Moderate | 45 |
| Methyl Ethyl Ketone | Fair | No | High | 25 |
| Ethyl Acetate | Good | No | Moderate | 15 |
| 1,1,1-Trichloroethane | Fair | No | Low | 25 |
| Methylene Chloride | Fair | No | Low | 10 |
| Tetrahydrofuran | Fair | No | High | 20 |
| Pentane | Good | Yes-High | Low | 300+ |

*Drying time required to obtain no adhesive transfer to glass surface

AEROSOL FORMULATION

| | |
|---|---|
| Hollow Microspheres | 6 grams |
| Solvent | 31.5 grams |
| Acetone | 12.5 grams |
| A-31 | 60 grams |

The hollow microspheres were as in Example 2 except 1.2% surfactant was used, and the reaction was run at 65 degrees C.

The compositions were applied from 6 fluid ounce metal aerosol containers fitted with 0.123 neoprene gaskets, Seaquist AR83 valves, and Seaquist 810-20-18 actuators.

The term "A-31" propellant is an industry-wide designator for isobutane propellant having 31 psig at 70 degrees F.

What is claimed is:

1. Hollow, polymeric, acrylate, inherently tacky, infusible, solvent-insoluble, solvent-dispersible, elastomeric pressure-sensitive adhesive microspheres having a diameter of at least 1 micrometer.

2. Hollow, polymeric, acrylate, inherently tacky, infusible, solvent-insoluble, solvent-dispersible, elastomeric pressure-sensitive adhesive microspheres according to claim 1 wherein a majority of said microspheres contain at least one interior void having a diameter at least about 10% of the diameter of said hollow microspheres.

3. Hollow, polymeric, acrylate, inherently tacky, infusible, solvent-insoluble, solvent-dispersible, elastomeric pressure-sensitive adhesive microspheres according to claim 1 wherein a majority of said microspheres contain at least one interior void having a diameter of at least about 20% of the diameter of said microspheres.

4. Hollow, polymeric, acrylate, inherently tacky, infusible, solvent-insoluble, solvent-dispersible, elastomeric pressure-sensitive adhesive microspheres according to claim 1 wherein a majority of said microspheres contain at least one interior void having a diameter of at least about 30% of the diameter of said microspheres.

5. Hollow, polymeric, acrylate, inherently tacky, infusible, solvent-insoluble, solvent-dispersible, pressure-sensitive microspheres according to claim 1 comprising an acrylate polymer having a glass transition temperature of no greater than about $-20°$ C.

6. Hollow, polymeric, acrylate, inherently tacky, infusible, solvent-insoluble, solvent-dispersible, pressure-sensitive microspheres according to claim 1 comprising:
   a) at least about 85 parts by weight of at least one alkyl acrylate or alkyl methacrylate ester, and
   b) correspondingly, up to about 15 parts by weight of at least one polar monomer.

7. The hollow microspheres of claim 6 wherein the alkyl acrylate is selected from the group consisting of isooctyl acrylate, 2-ethyl hexyl acrylate, isononyl acrylate, isoamyl acrylate, isodecyl acrylate and butyl acrylate.

8. The hollow microspheres of claim 6 wherein the polar monomer is selected from the group consisting of acrylic acid, methacrylic acid, itaconic acid, crotonic acid, maleic acid, fumaric acid, and salts thereof.

9. A particulate pressure-sensitive adhesive consisting essentially of the hollow microspheres of claim 1.

10. A particulate pressure-sensitive adhesive consisting essentially of the hollow microspheres of claim 6.

11. A repositionable spray pressure-sensitive adhesive comprising the hollow microspheres of claim 1 and a liquid medium therefor.

12. A repositionable spray pressure-sensitive adhesive according to claim 11 further comprising a propellant selected from the group consisting of alkanes, alkenes, and chlorofluorocarbons.

13. A sheet material having coated on at least a portion thereof the pressure-sensitive adhesive of claim 9.

14. An aqueous suspension comprising the hollow microspheres of claim 1.

* * * * *

UNITED STATES PATENT AND TRADEMARK OFFICE
CERTIFICATE OF CORRECTION

PATENT NO. : 5,045,569

DATED : September 3, 1991

INVENTOR(S) : Joaquin Delgado

It is certified that error appears in the above-identified patent and that said Letters Patent is hereby corrected as shown below:

Col. 2, line 2, "produces" should read --produce--.

Col. 6, line 66, "sulfate" should read --sulfates--.

Col. 13, Table V, Under "Emulsifier II" in "Example 30," "1.5 g ammonium" should be followed by --lauryl sulfate--.

Signed and Sealed this

First Day of June, 1993

Attest:

MICHAEL K. KIRK

*Attesting Officer*     Acting Commissioner of Patents and Trademarks